(12) United States Patent
Agrawal et al.

(10) Patent No.: US 12,254,233 B2
(45) Date of Patent: Mar. 18, 2025

(54) REMOTE ASSISTANCE VIA VIDEO CONFERENCING

(71) Applicant: Motorola Mobility LLC, Chicago, IL (US)

(72) Inventors: Amit Kumar Agrawal, Bangalore (IN); Wang Xuejin, Xiamen (CN); Cai Zhiyi, Xiamen (CN); Zhang Mingping, Xiamen (CN); Wang Yuliang, Xiamen (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/461,364

(22) Filed: Sep. 5, 2023

(65) Prior Publication Data
US 2025/0053368 A1 Feb. 13, 2025

(51) Int. Cl.
*G06F 3/14* (2006.01)
*G06F 3/0488* (2022.01)

(52) U.S. Cl.
CPC .......... *G06F 3/1454* (2013.01); *G06F 3/0488* (2013.01)

(58) Field of Classification Search
CPC .............................. G06F 3/1454; G06F 3/0488
See application file for complete search history.

(56) References Cited

U.S. PATENT DOCUMENTS

| 2013/0159880 A1* | 6/2013 | Bhogal | H04L 65/403 |
| | | | 715/753 |
| 2015/0381931 A1 | 12/2015 | Uhma et al. | |
| 2016/0066355 A1* | 3/2016 | Chakraborty | H04W 4/21 |
| | | | 348/143 |
| 2016/0070534 A1 | 3/2016 | Kripalani et al. | |
| 2018/0049023 A1 | 2/2018 | Stuber et al. | |
| 2023/0138804 A1 | 5/2023 | Mao et al. | |
| 2023/0333803 A1* | 10/2023 | Su | H04M 1/72469 |

OTHER PUBLICATIONS

PCT/CN2023/112287 , "International Seach Report and Written Opinion", PCT Application No. PCT/CN2023/112287, Jan. 24, 2024, 11 pages.

* cited by examiner

*Primary Examiner* — Haoshian Shih
(74) *Attorney, Agent, or Firm* — FIG. 1 Patents

(57) ABSTRACT

In aspects of remote assistance via video conferencing, a manager device establishes a connection to a video conferencing call and sends a device control request that requests control of a managed device also on the video conferencing call. The manager device displays a screen view of the managed device on a display of the manager device based on a device control response from the managed device approving the device control request. The manager device detects a touch input at the display of the manager device and sends, to the managed device, position information of the touch input relative to a coordinate of the display of the manager device and/or relative to a coordinate of the display of the managed device. The manager device receives feedback that confirms the position information of the touch input is implemented as a touch event at the managed device.

20 Claims, 6 Drawing Sheets

REMOTE ASSISTANCE VIA VIDEO CONFERENCING

RELATED APPLICATION

This application claims priority benefit of Application Number PCT/CN2023/112287 filed 10 Aug. 2023 entitled "Remote Assistance via Video Conferencing," the disclosure of which is incorporated by reference herein in its entirety.

BACKGROUND

The video conferencing market is a growing market, which was accelerated largely due to the global pandemic. The continued growth of video conferencing in general is occurring due to the increase in the proliferation of mobile devices. Mobile devices enable participants to join a video conference from almost anywhere in the world. However, at times a user of a mobile device connected to a video conferencing needs assistance with using or configuring the mobile device. Currently, communication applications do not provide a way for users to provide or receive assistance in a relatively seamless manner during video conferencing.

BRIEF DESCRIPTION OF THE DRAWINGS

Implementations of the techniques for remote assistance via video conferencing are described with reference to the following Figures. The same numbers may be used throughout to reference like features and components shown in the Figures.

DETAILED DESCRIPTION

Figure 1:
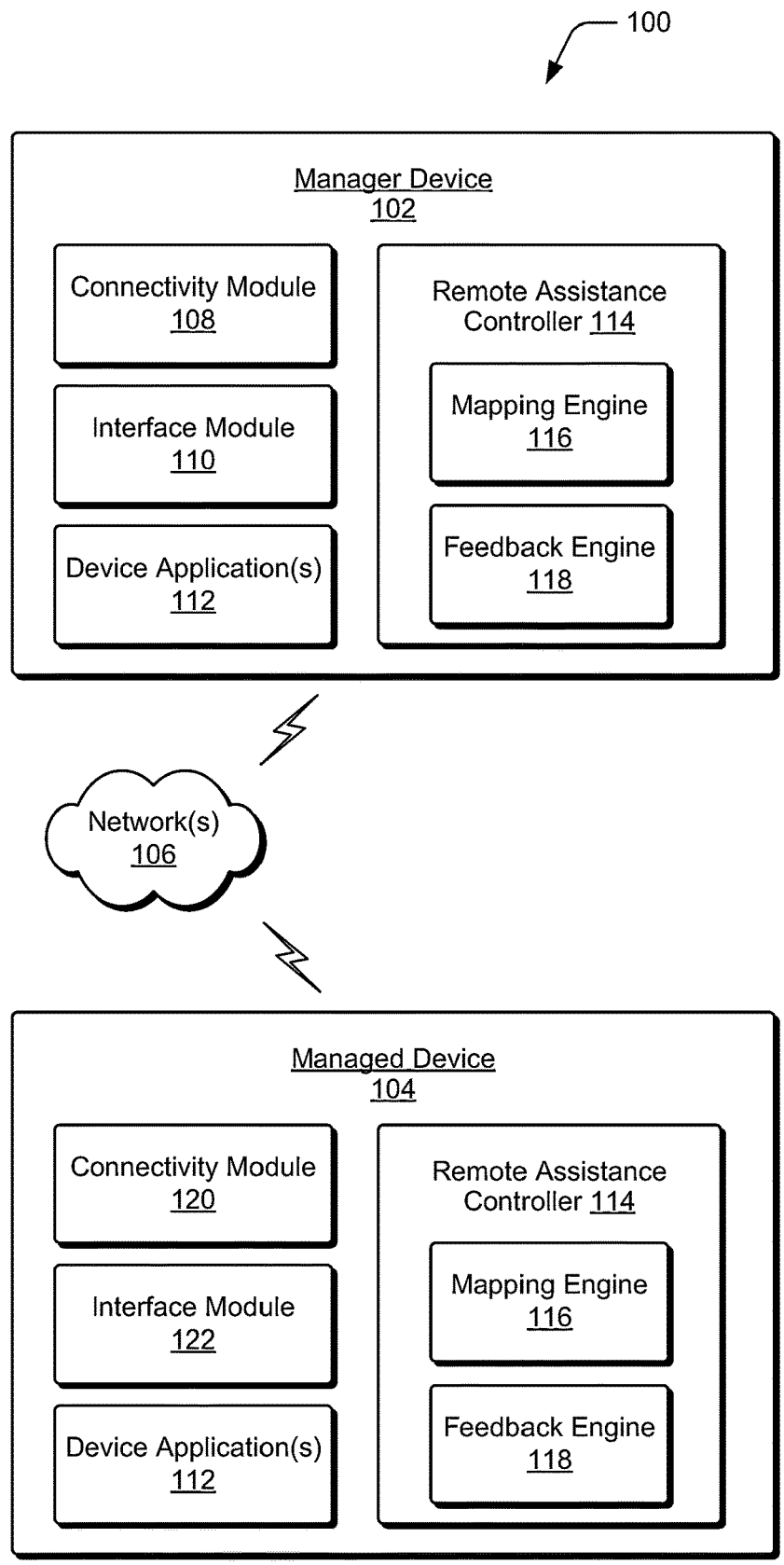
FIG. 1 illustrates an example system for remote assistance via video conferencing in accordance with one or more implementations as described herein.

Implementations of the techniques for remote assistance via video conferencing may be implemented as described herein. Reference herein to a manager device or a managed device refers to a media device. A media device such as any type of a wireless device, mobile device, mobile phone, flip phone, client device, game controller, wearable computing device, camera device, display device, tablet, computing device, communication device, entertainment device, gaming device, media playback device, and/or any other type of computing and/or electronic device, or a system of any combination of such devices, may be configured to perform techniques for remote assistance via video conferencing as described herein. In one or more implementations, at least one media device implements an instantiation of a remote assistance controller, enabling the remote assistance functionality described herein.

Generally, a media device (e.g., smartphone, tablet, mobile device) is configured to establish a connection to a video conferencing call. In one or more examples, a first user of a first media device does not know how to configure or manage the first media device. Conventional approaches include the first user calling a second user and the second user talking the first user through instructions for configuring or managing the first media device. Conventional approaches take considerable amounts of time and often the first user ends up confused and is unable to follow along.

In one or more examples, a mobile device is configured to implement a session initiation protocol (SIP) that support device to device (D2D) application programming interfaces (APIs). Conventional SIP approaches do not support remote assistance protocols or remote control protocols. For example, conventional SIP approaches provide support for indicating audio codecs supported (enhanced voice service (EVS), adaptive multi-rate wideband (AMR-WB), adaptive multi-rate narrowband (AMR-NB)), indicating supported network types (e.g., long term evolution (LTE), new radio (NR), wireless local area network (WLAN), etc.), indicating battery state (e.g., low charge, fully charged, healthy battery, battery is charging), and indicating network coverage (e.g., poor coverage, low bandwidth, high bandwidth). However, conventional SIP D2D APIs do not support remote assistance protocols or remote control protocols.

In aspects of the described techniques, a remote assistance controller implements remote assistance functionality to enable the second user to provide remote assistance to the first user directly over the video conferencing call. In one or more examples, the remote assistance functionality is performed via a first media device (e.g., a managed device) that implements an instantiation of a remote assistance controller and/or a second media device (e.g., a manager device) that implements an instantiation of the remote assistance controller.

In one or more examples, the first media device (e.g., managed device) and the second media device (e.g., manager device) are connected to a video conferencing call. The first user indicates to the second user that there is an issue with the first media device. In response, the second user enables the remote assistance functionality of the remote assistance controller. Accordingly, the remote assistance controller sends a device control request to the first media device. The device control request includes a request to take control of the first media device. In one or more examples, the device control request includes a prompt displayed on the first media device. For example, the prompt may indicate that the second media device requests control of the first media device. Additionally or alternatively, the prompt may include a first on-screen button to accept the device control request and a second on-screen button to deny the device control request.

In one or more implementations, the remote assistance controller transmits a device control response approving the device control request. For example, based on the first user clicking on the first on-screen button to accept the device control request, the remote assistance controller transmits the approval. Based on the approval, the remote assistance controller of the first media device transmits a live feed of a screen view of the first media device (e.g., via the video conferencing call). The remote assistance controller of the second media device receives the live feed of the screen view of the first media device. The remote assistance controller of the second media device enables the second user to touch the screen of the second media device and translate this touch input into a touch event at the first media device.

In one or more implementations, the remote assistance controller detects a touch input at the display of the second media device. In one or more examples, the remote assistance controller sends position information of the touch input to the first media device. The remote assistance controller of the first media device receives the position information and converts the position information into a touch event at the first media device. The remote assistance controller of the first media device sends feedback confirming that the position information of the touch input is successfully converted into a touch event and/or that the position information has been successfully implemented as a touch event at the first media device. In one or more examples, the feedback is communicated graphically via the live feed of the screen view of the first media device. For example, the touch event toggles a setting at the first media device and the live feed of the screen view shows the setting being toggled on the first media device in response to the touch input at the second media device.

While features and concepts of the described techniques for remote assistance via video conferencing is implemented in any number of different media devices, systems, environments, and/or configurations, implementations of the techniques for remote assistance via video conferencing are described in the context of the following example devices, systems, and methods.

FIG. 1 illustrates an example system 100 for remote assistance via video conferencing, as described herein. The system 100 includes one or more media devices, such as a manager device 102 and/or a managed device 104. Examples of media devices include at least one of any type of a wireless device, mobile device, mobile phone, flip phone, client device, game controller, wearable computing device, camera device, display device, tablet, computing device, communication device, entertainment device, gaming device, media playback device, any other type of computing and/or electronic device, and/or a system of any combination of such devices.

The manager device 102 and/or the managed device 104 is implemented with various components, such as a processor system and memory, as well as any number and combination of different components as further described with reference to the example device shown in FIG. 6. In implementations, the manager device 102 includes various radios for wireless communication with other devices. In one or more examples, the manager device 102 includes at least one of a BLUETOOTH® (BT) or BLUETOOTH® Low Energy (BLE) transceiver, a near field communication (NFC) transceiver, or the like. In one or more implementations, the manager device 102 includes at least one of a WI-FI® radio, a cellular radio, a global positioning satellite (GPS) radio, or any available type of device communication interface.

Additionally, or alternatively, the system 100 includes a managed device 104, such as any type of media device as described herein. Similar to the manager device 102, the managed device 104 is implemented with various components, such as a processor system and memory, as well as any number and combination of the different components as further described with reference to the example device shown in FIG. 6. In implementations, the manager device 102 is communicatively linked to the managed device 104. For example, the manager device 102 and the managed device 104 are communicatively linked via a communication network 106 and/or via direct inter-device connectivity between the manager device 102 and the managed device 104.

In some implementations, the devices, applications, modules, servers, and/or services described herein communicate via the communication network 106, such as for data communication between the manager device 102 and the managed device 104. The communication network 106 includes a wired and/or a wireless network. The communication network 106 is implemented using any type of network topology and/or communication protocol, and is represented or otherwise implemented as a combination of two or more networks, to include IP-based networks, cellular networks, and/or the Internet. The communication network 106 includes mobile operator networks that are managed by a mobile network operator and/or other network operators, such as a communication service provider, mobile phone provider, and/or Internet service provider.

The manager device 102 includes various functionality that enables the device to implement different aspects of remote assistance via video conferencing, as described herein. In this example, the manager device 102 includes a connectivity module 108, an interface module 110, device applications 112, and a remote assistance controller 114. The connectivity module 108 represents functionality (e.g., logic, software, and/or hardware) enabling the manager device 102 to interconnect with other devices and/or networks, such as the managed device 104 and the communication network 106. For example, the connectivity module 108 enables wireless and/or wired connectivity of the manager device 102. The interface module 110 represents functionality enabling the manager device 102 to interface with other devices. As further detailed below, the interface module 110 enables the manager device 102 to establish wireless and/or wired data communication with other devices, such as the managed device 104 or similar presentation device.

Similarly, the managed device 104 includes various functionality that enables the computing device to implement different aspects of remote assistance via video conferencing, as described herein. In this example, the managed device 104 includes a connectivity module 120, an interface module 122, and device applications 112. The connectivity module 120 represents functionality (e.g., logic, software, and/or hardware) enabling the managed device 104 to interconnect with other devices and/or networks, such as the manager device 102 and the communication network 106. For example, the connectivity module 120 enables wireless and/or wired connectivity of the managed device 104. The interface module 122 represents functionality enabling the managed device 104 to interface with other devices. As further detailed below, the interface module 122 enables the managed device 104 to establish wireless and/or wired data communication with other devices, such as the manager device 102 or similar devices.

In one or more examples, a video conferencing call is established between the manager device 102 and the managed device 104 that enables the manager device 102 to provide remote assistance to the managed device 104. In one or more implementations, the video conferencing call is established via intercommunication between the interface module 110 of the manager device 102 and the interface module 122 of the managed device 104.

In the illustrated example, the manager device 102 and/or the managed device 104 include and implement device applications 112, such as any type of messaging application, email application, video communication application, cellular communication application, music/audio application, gaming application, media application, social platform applications, and/or any other of the many possible types of device applications. Many of the device applications 112 have an associated application user interface that is generated and displayed for user interaction and viewing, such as on a display screen of the manager device 102 and/or on a display of the managed device 104. Generally, an application user interface, or any other type of video, image, graphic, and the like is digital image content that is displayable on the display screen of the manager device 102 and/or on the display of the managed device 104.

In the example system 100, the manager device 102 and the managed device 104 are media devices that incorporate remote assistance functionality. At least one of the manager device 102 or the managed device 104 implements an instantiation of a remote assistance controller 114 (e.g., as a device application 112). As shown, the remote assistance controller 114 includes mapping engine 116 and feedback engine 118. The remote assistance controller 114 represents functionality (e.g., logic, software, and/or hardware) enabling implementation of described techniques for remote assistance via video conferencing. The remote assistance controller 114 can be implemented as computer instructions stored on computer-readable storage media and can be executed by a processor system of the manager device 102 and/or of the managed device 104. Alternatively or in addition, the remote assistance controller 114 can be implemented at least partially in hardware of a device.

In one or more implementations, the remote assistance controller 114 includes independent processing, memory, and/or logic components functioning as a computing and/or electronic device integrated with the manager device 102 and/or with the managed device 104. Alternatively or in addition, the remote assistance controller 114 can be implemented in software, in hardware, or as a combination of software and hardware components. In this example, the remote assistance controller 114 is implemented as a software application or module, such as executable software instructions (e.g., computer-executable instructions) that are executable with a processor system of the manager device 102 and/or the managed device 104 to implement the techniques and features described herein. As a software application or module, the remote assistance controller 114 can be stored on computer-readable storage memory (e.g., memory of a device), or in any other suitable memory device or electronic data storage implemented with the module. Alternatively or in addition, the remote assistance controller 114 is implemented in firmware and/or at least partially in computer hardware. For example, at least part of the remote assistance controller 114 is executable by a computer processor, and/or at least part of the content manager is implemented in logic circuitry.

In the illustrated example, the remote assistance controller 114 sends a device control request requesting control of the managed device 104. Additionally or alternatively, the remote assistance controller 114 of the manager device 102 sends a device control request via an established video conferencing connection between at least the manager device 102 and the managed device 104. The remote assistance controller 114 of the managed device 104 receives a device control request from the manager device 102 requesting control of the managed device 104.

In one or more examples, the remote assistance controller 114 of the managed device 104 sends to the manager device 102 a device control response approving the device control request. The remote assistance controller 114 sends an indication of a screen size of the managed device 104 with the device control response approving the device control request. The remote assistance controller 114 of the managed device 104 sends a screen view of the managed device 104 to the manager device 102 based on a device control response approving the device control request. Additionally or alternatively, the screen view includes streaming a continuous live feed of the screen view of the managed device 104 to the manager device 102.

In one or more implementations, the remote assistance controller 114 of the manager device 102 displays a screen view of the managed device 104 on a display of the manager device 102 based on receiving a device control response approving the device control request. The remote assistance controller 114 detects a touch input at the display of the manager device 102. Additionally or alternatively, the remote assistance controller 114 of the manager device 102 sends, to the managed device 104, position information of the touch input.

In one or more examples, the remote assistance controller 114 receives an indication of a screen size of the managed device 104 with the device control response approving the device control request. Additionally or alternatively, the remote assistance controller 114 displaying the screen view of the managed device 104 is based on the remote assistance controller 114 adapting the screen size of the managed device 104 to the display of the manager device 102.

In one or more implementations, the remote assistance controller 114 detecting the touch input at the manager device 102 is based on the remote assistance controller 114 receiving a live feed of the screen view of the managed device 104 and the remote assistance controller 114 displaying the live feed of the screen view of the managed device 104 on the display of the manager device 102. Additionally or alternatively, the position information is based on the remote assistance controller 114 mapping a source coordinate of the touch input at the manager device 102 to a destination coordinate of a display of the managed device 104.

In one or more examples, the remote assistance controller 114 of the managed device 104 receives the position information of a touch input on a display of the manager device 102. The position information includes at least one of a horizontal coordinate or a vertical coordinate of the touch input on the display of the manager device 102. The remote assistance controller 114 of the managed device 104 converts the position information into a touch event at the managed device 104. Additionally or alternatively, the remote assistance controller 114 converting the position information is based on the remote assistance controller 114 mapping a source coordinate of the touch input at the manager device 102 to a destination coordinate of a display of the managed device 104.

In one or more implementations, the remote assistance controller 114 of the managed device 104 sends feedback confirming that the position information of the touch input on the display of the manager device 102 is implemented as the touch event at the managed device 104. Additionally or alternatively, the remote assistance controller 114 of the manager device 102 receives the feedback confirming that the position information of the touch input is implemented as a touch event at the managed device 104. In one or more examples, the feedback includes a visual modification of a graphical user interface of the managed device 104 being shown on the display of the manager device 102. Additionally or alternatively, the feedback includes a message generated for display at the managed device 104 and shown on the display of the manager device 102.

In one or more implementations, the remote assistance controller 114 enables remote assistance via video calls using a session initiation protocol (SIP). For example, the remote assistance controller 114 provides enhanced SIP device to device (D2D) application programming interfaces (APIs) for remote assistance over video calls (e.g., video over long term evolution (ViLTE) calls).

In one or more implementations, the manager device 102 is communicatively coupled (e.g., a wireless connection via the communication network 106) to the managed device 104 (e.g., a remote device). The remote assistance controller 114 detects the manager device 102 or the managed device 104 initiating a video assistance mode. In one or more examples, the manager device 102 and the managed device 104 use an enhanced SIP D2D API to provide remote assistance over a video call. In one or more implementations, the remote assistance controller 114 includes and/or implements the enhanced SIP D2D API. The enhanced SIP D2D API is based on any combination of hardware, software, and/or logic to provide the remote assistance over a video call (e.g., ViLTE).

In one or more implementations, the enhanced SIP D2D API replaces a camera feed of a video call with a feed of device screen frames. For example, during a video call, a camera of the managed device 104 captures video frames (e.g., of a user of the managed device 104) and transmits the captured video frames to the manager device 102. However, based on the enhanced SIP D2D API, the remote assistance controller 114 captures screenshots of the active view on the screen of the managed device 104. The enhanced SIP D2D API captures the screenshots at some frame rate (e.g., 15 screenshots per second, 24 screenshots per second, 30 screenshots per second, etc.). And instead of transmitting the video frames captured by the camera of the managed device 104, the enhanced SIP D2D API transmits the captured live view of the screen of the managed device 104 to the manager device 102.

In one or more implementations, the enhanced SIP D2D API includes a SIP communication channel used to transfer touch events. In one or more examples, the SIP communication channel is based on user input back channel (UIBC) control for communicating input commands between the manager device 102 and the managed device 104.

In one or more implementations, the enhanced SIP D2D API includes one or more control instructions, such as remote control request messages, remote control handshake negotiation messages, transfer a touch event, and the like. The enhanced SIP D2D API enables remote assistance on any video call (e.g., ViLTE, etc.). The enhanced SIP D2D API works with any application that implements video calling and that is configured for the SIP D2D API.

In one or more examples, the enhanced SIP D2D API indicates video screen information (e.g., DiagnosticCall.MESSAGE_DEVICE_SCREEN-VIDEO_INFO). In one or more variations, the remote assistance controller 114 of the managed device 104 sends the video screen information to the manager device 102 after remote assistance is initiated. In one or more variations, the video screen information includes a width and/or a height of a screen view of the managed device 104 (e.g., width/height of a display, width/height of part of the display). In one or more variations, the video screen information includes an integer value (e.g., 32 bit integer value) that includes a width (e.g., 0-15 bits for width) and a height (e.g., 16-31 bits for height). In one or more examples, the enhanced SIP D2D API sends the video screen information initially and then sends updated video screen information when the screen video information changes. For example, the initial video screen information is based on initially using a first portion of a display and subsequently using a different portion of the display (e.g., move an active window on the screen, flip from portrait mode to landscape mode, etc.).

In one or more examples, the enhanced SIP D2D API indicates one or more touch events (e.g., DiagnosticCall.MESSAGE_DEVICE_TOUCH_EVENT).

In one or more variations, the remote assistance controller 114 of the manager device 102 sends touch event information to the managed device 104 after detecting a touch event at the manager device 102. In one or more variations, the touch event information includes a coordinate value (e.g., an x value of a touch event and/or a y value of a touch event). In one or more variations, the touch event information includes an integer value (e.g., 32 bit integer value) that includes an x coordinate (e.g., 0-15 bits for x coordinate) and a y coordinate (e.g., 16-31 bits for y coordinate).

In one or more examples, the enhanced SIP D2D API indicates one or more control requests (e.g., DiagnosticCall.MESSAGE_DEVICE_CONTROL_REQUEST). In one or more variations, the remote assistance controller 114 of the managed device 104 sends a control request to the manager device 102 to initiate remote assistance over a video call. Additionally or alternatively, the remote assistance controller 114 of the manager device 102 and/or the managed device 104 communicate (e.g., send and/or receive) one or more control request messages to configure and establish the remote assistance over the video call (e.g., communicating one or more control messages of a handshake protocol of the enhanced SIP D2D API). Additionally or alternatively, the remote assistance controller 114 of the manager device 102 sends a control request to the managed device 104 requesting to remotely control one or more aspects of the managed device 104 (e.g., remotely control one or more interfaces of the managed device 104).

In one or more examples, the enhanced SIP D2D API indicates one or more control responses (e.g., DiagnosticCall.MESSAGE_DEVICE_CONTROL_RESPONSE). In one or more variations, the remote assistance controller 114 of the managed device 104 sends a control response to the manager device 102 to accept or deny a request from the manager device 102 to control the managed device 104 remotely over a video call. In one or more variations, the remote assistance controller 114 of the manager device 102 sends a control response to the managed device 104 to accept or deny a request from the managed device 104 to control the managed device 104 remotely over a video call.

The enhanced SIP D2D API provides several advantages. For example, the enhanced SIP D2D API enables a user of the managed device 104 to receive remote assistance during a video call by sharing a screen view with a remote user of the manager device 102 and having touch events communicated from the manager device 102 to the managed device 104. Moreover, because mobile devices support the SIP D2D API, the remote assistance controller 114 implementing the enhanced SIP D2D API enables a mobile device (e.g., the manager device 102, the managed device 104) to support the enhanced remote assistance whether or not an underlying video call application supports the remote screen control functionality of the enhanced SIP D2D API.

Figure 2:
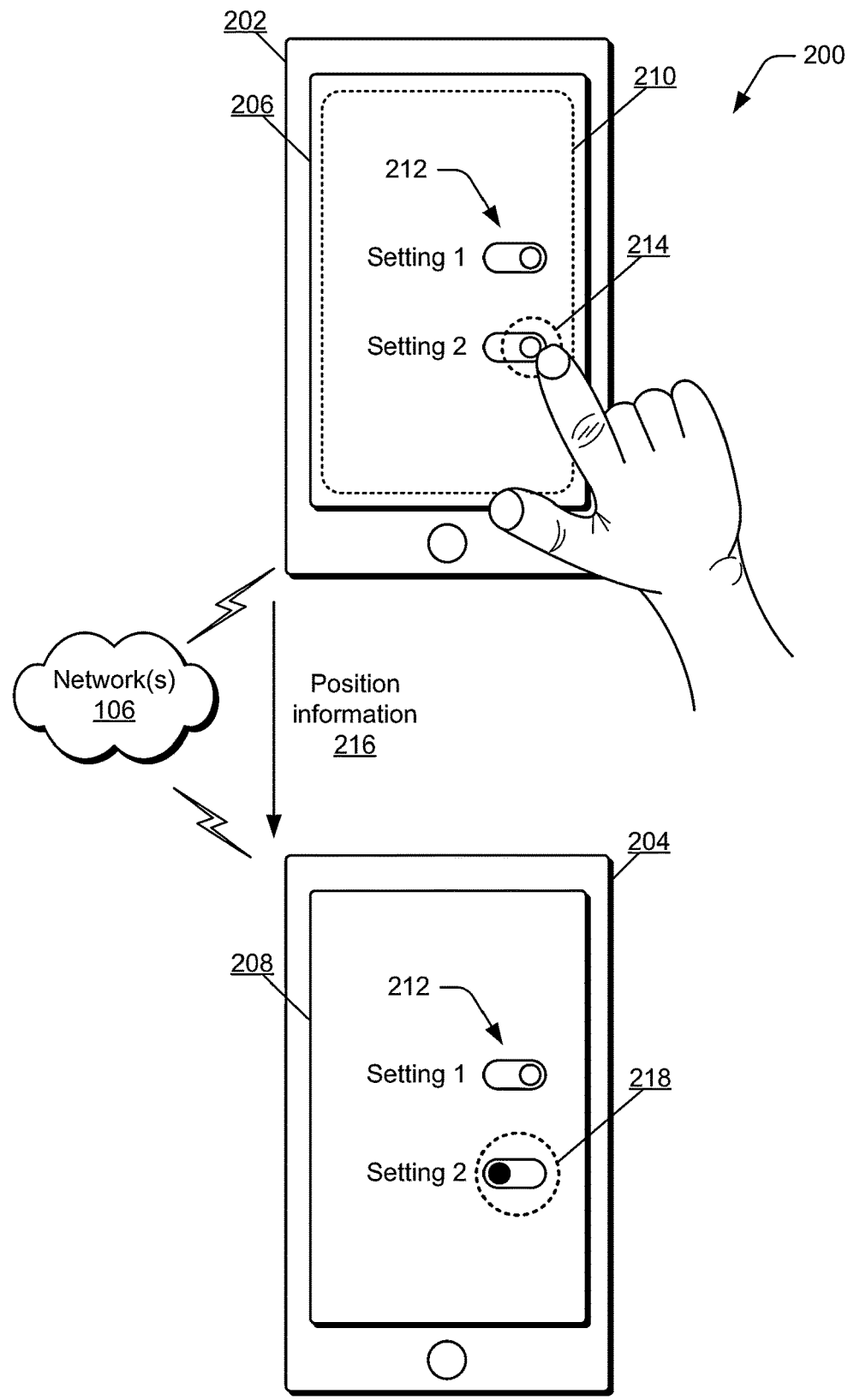
FIG. 2 further illustrates an example of remote assistance via video conferencing in accordance with one or more implementations as described herein.

FIG. 2 illustrates example 200 of remote assistance via video conferencing, as described herein. The example 200 is an example of the remote assistance functionality for remote assistance via video conferencing of system 100 shown in FIG. 1.

As shown, the example 200 includes a manager device 202 and a managed device 204. In the illustrated example, the manager device 202 includes a display 206 and the managed device 204 includes a display 208. The display 206 shows a screen view 210 of the managed device 204 (e.g., based on a device control response approving a device control request from the manager device 202). The screen view 210 is a live feed of a view being shown on the display 208 of the managed device 204. As shown, the display 208 shows an interface 212 that includes one or more settings (e.g., a first setting and a second setting). Because the screen view 210 is a live feed of the view being shown on the display 208 of the managed device 204, the screen view 210 shows the interface 212 with the one or more settings.

In one or more implementations, a user of the manager device 202 touches the display 206 of the manager device 202. The manager device 202 detects the touch of the user as a touch input 214. In one or more examples, the manager device 202 detects the touch input 214 via an instance of the remote assistance controller 114 on the manager device 202. The manager device 202 communicates the position information 216 of the touch input 214 to the managed device 204 via the communication network 106. In one or more examples, the manager device 202 communicates the position information 216 via the instance of the remote assistance controller 114 on the manager device 202.

In one or more implementations, the managed device 204 receives the position information 216 and converts the position information 216 into a touch event 218 at the managed device 204. In one or more examples, the managed device 204 converts the position information 216 into the touch event 218 via an instance of the remote assistance controller 114 on the managed device 204. In the illustrated example, the touch event 218 is a toggling of the second setting of the interface 212. In one or more variations, the toggling of the second setting of the interface 212 is conveyed to the manager device 202 via the live feed of the screen view 210 of the managed device 204. Accordingly, the manager device 202 receives feedback (e.g., graphically via the screen view 210) that the touch input 214 is implemented as the touch event 218 on the managed device 204.

Example methods 300, 400, and 500 are described with reference to respective FIGS. 3, 4, and 5 in accordance with one or more implementations of remote assistance via video conferencing, as described herein. Generally, any services, components, modules, managers, controllers, methods, and/or operations described herein can be implemented using software, firmware, hardware (e.g., fixed logic circuitry), manual processing, or any combination thereof. Some operations of the example methods is described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
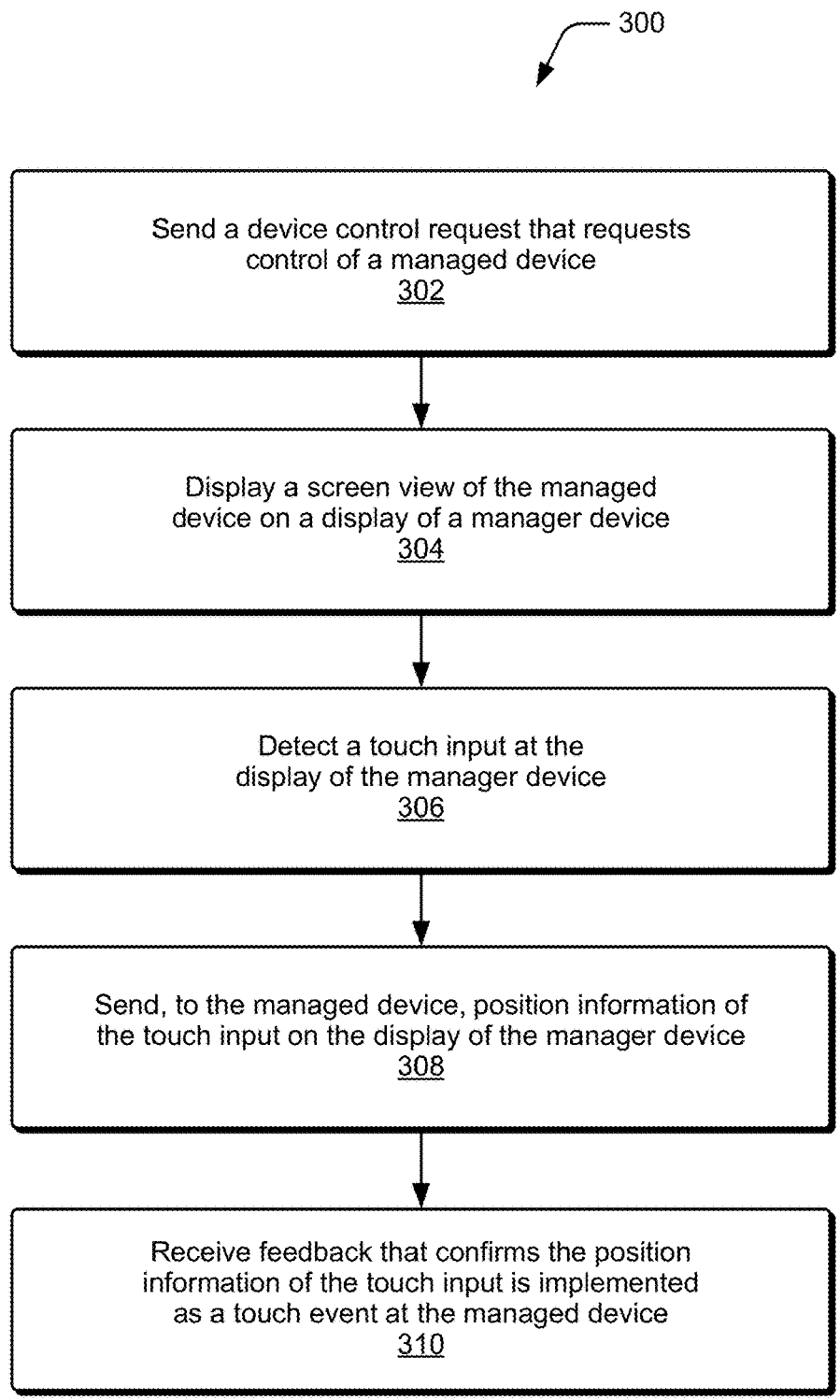
FIGS. 3-5 illustrate example methods for remote assistance via video conferencing in accordance with one or more implementations of the techniques described herein.

FIG. 3 illustrates example method(s) 300 for remote assistance via video conferencing. The order in which the method is described is not intended to be construed as a limitation, and any number or combination of the described method operations may be performed in any order to perform a method, or an alternate method.

At 302, the method 300 includes sending, by a manager device with an established video conferencing connection, a device control request requesting control of a managed device. Additionally or alternatively, the remote assistance controller 114 of the manager device 102 receives a request for assistance from the managed device 104.

At 304, the method 300 includes displaying a screen view of the managed device on a display of the manager device. In one or more examples, the screen view of the managed device 104 is shown on the display of the manager device 102 based on receiving a device control response approving the device control request. Additionally or alternatively, the screen view of the managed device 104 is shown on the display of the manager device 102 based on the manager device receiving a request for assistance from the managed device.

At 306, the method 300 includes detecting a touch input at the display of the manager device. For example, the remote assistance controller 114 detects a user touching a touchscreen display of the manager device 102.

At 308, the method 300 includes sending, to the managed device, position information of the touch input on the display of the manager device. For example, the remote assistance controller 114 sends position information of the touch input to the manager device 102. The position information includes at least one of a horizontal coordinate or a vertical coordinate of the touch input on the touchscreen display of the manager device. Based on a mapping between the display of the manager device 102 and the display of the managed device 104, the position information includes at least one of a horizontal coordinate or a vertical coordinate of the display of the managed device relative to the position of the touch input on the display of the manager device.

At 310, the method 300 includes receiving feedback confirming that the position information of the touch input is implemented as a touch event at the managed device. For example, the remote assistance controller 114 receives graphical feedback and/or a message confirming that the position information of the touch input is implemented as a touch event at the managed device 104.

Figure 4:
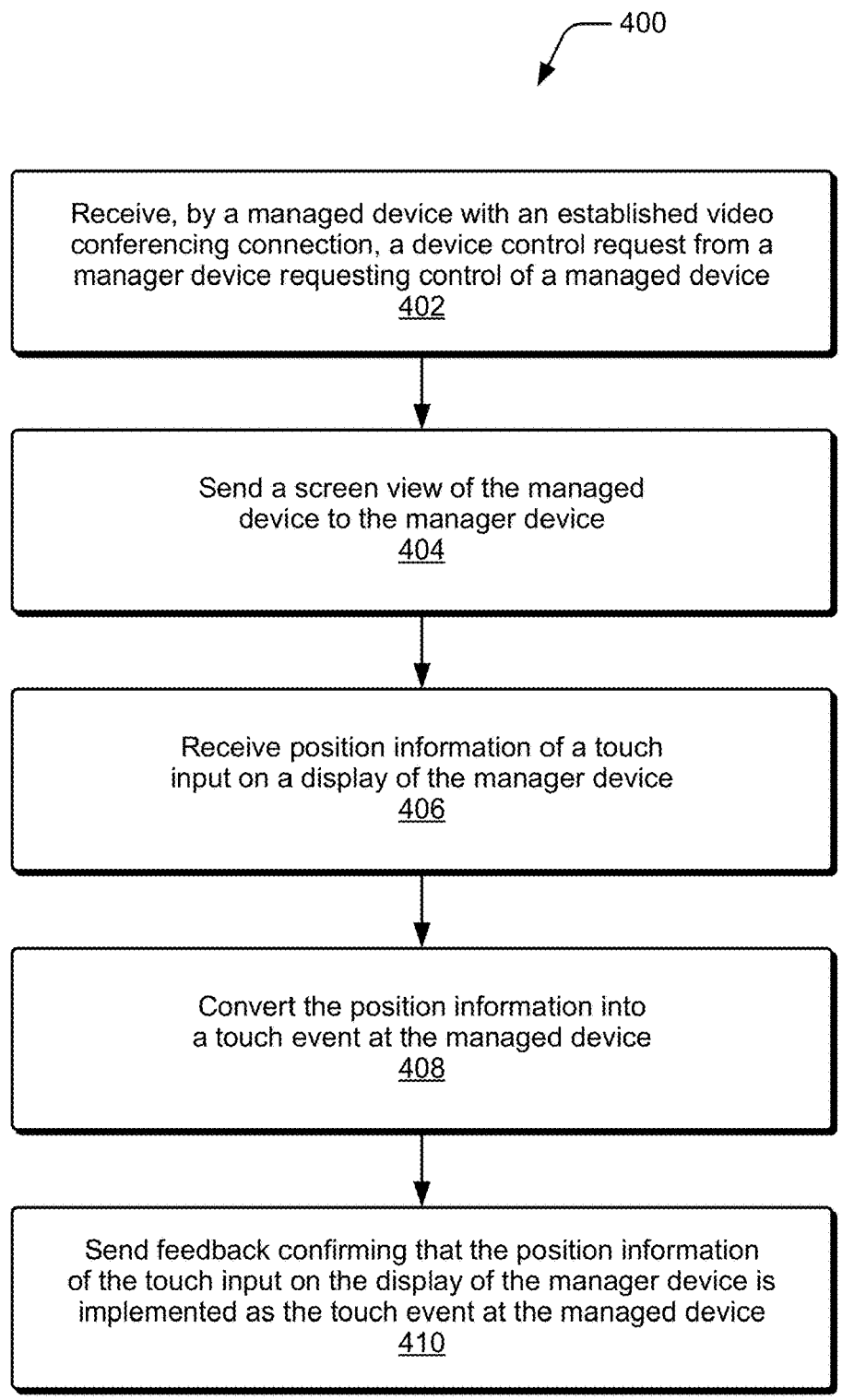

FIG. 4 illustrates example method(s) 400 for remote assistance via video conferencing. The order in which the method is described is not intended to be construed as a limitation, and any number or combination of the described method operations may be performed in any order to perform a method, or an alternate method.

At 402, the method 400 includes receiving, over an established video conferencing connection, a device control request from a manager device requesting control of a managed device. Additionally or alternatively, the remote assistance controller 114 of the managed device sends a request for assistance to the manager device.

At 404, the method 400 includes sending a screen view of the managed device to the manager device. In one or more examples, the managed device 104 sends the screen view to the manager device 102 based on a device control response approving the device control request. Additionally or alternatively, the screen view of the managed device 104 is sent to the manager device 102 based on the managed device sending a request for assistance to the manager device.

At 406, the method 400 includes receiving position information of a touch input on a display of the manager device. For example, the remote assistance controller 114 of the managed device 104 receives the position information based on a touch input at the manager device 102.

At 408, the method 400 includes converting the position information into a touch event at the managed device. For example, the remote assistance controller 114 converts the position information into a touch event as if the touch input at the manager device 102 occurs at the managed device 104.

At 410, the method 400 includes sending feedback confirming that the position information of the touch input on the display of the manager device is implemented as the touch event at the managed device. For example, the remote assistance controller 114 of the managed device 104 sends a graphical feedback view of the screen view and/or a message confirming that the position information of the touch input is implemented as the touch event at the managed device.

Figure 5:
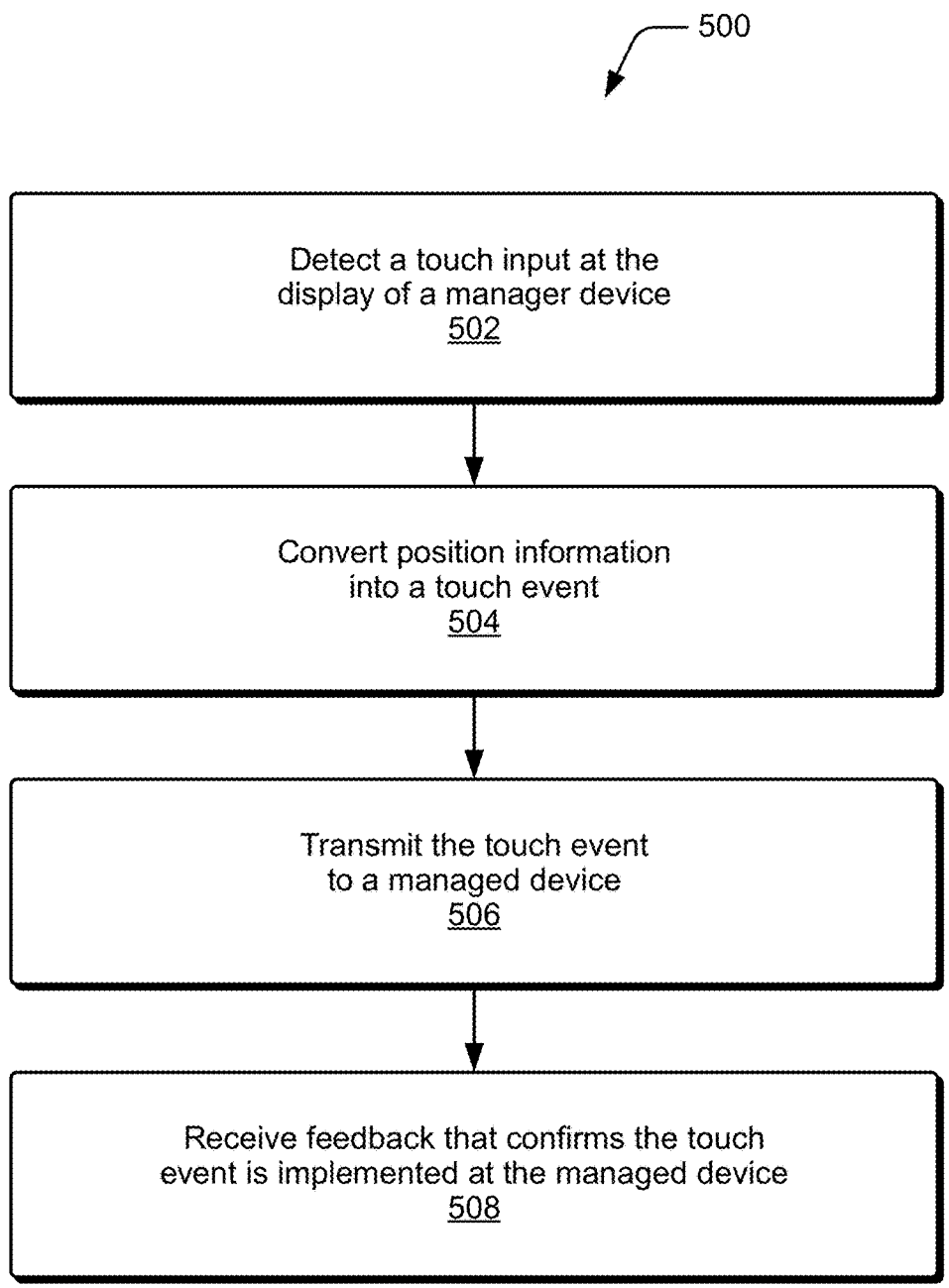

FIG. 5 illustrates example method(s) 500 for remote assistance via video conferencing. The order in which the method is described is not intended to be construed as a limitation, and any number or combination of the described method operations may be performed in any order to perform a method, or an alternate method.

At 502, the method 500 includes detecting a touch input at the display of a manager device. For example, the remote assistance controller 114 detects a user touching a touchscreen display of the manager device 102.

At 504, the method 500 includes converting the position information into a touch event (e.g., a remotely-generated touch event). For example, the remote assistance controller 114 maps a source coordinate (e.g., horizontal coordinate and/or vertical coordinate) of the touch input at the manager device 102 to a destination coordinate (e.g., horizontal coordinate and/or vertical coordinate) of a display of the managed device 104.

At 506, the method 500 includes transmitting the touch event to a managed device. For example, the remote assistance controller 114 sends the touch event to the managed device 104, where the managed device implements the touch event as if the remotely-generated touch event originated at the managed device.

At 508, the method 500 includes receiving feedback that confirms the touch event is implemented at the managed device. For example, the remote assistance controller 114 receives graphical feedback and/or a message confirming that the converted touch event is implemented as a touch event at the managed device.

Figure 6:
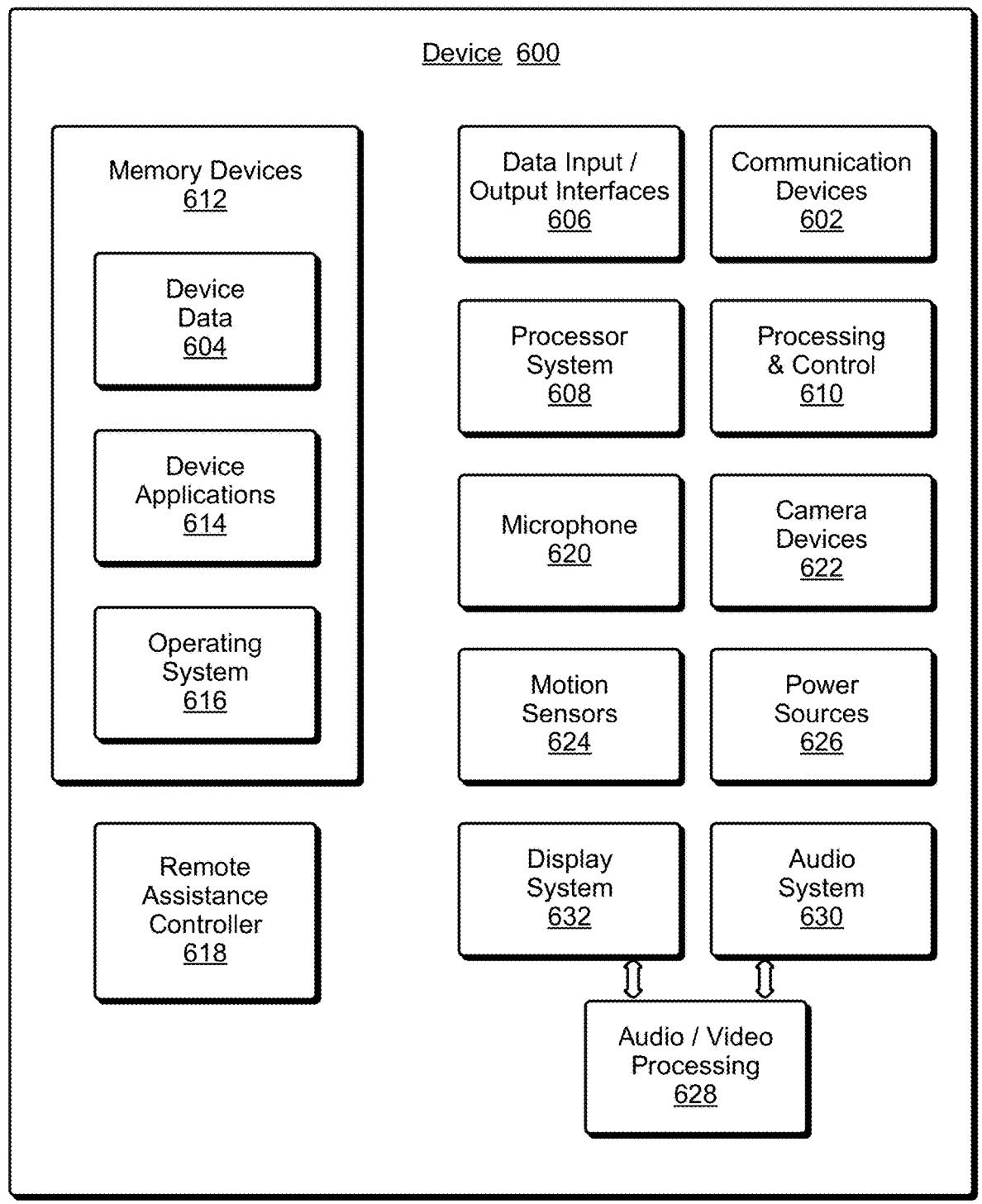
FIG. 6 illustrates various components of an example device that may be used to implement the techniques for remote assistance via video conferencing as described herein.

FIG. 6 illustrates various components of an example device 600, which can implement aspects of the techniques and features for remote assistance via video conferencing, as described herein. The example device 600 may be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the manager device 102 and/or the managed device 104 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 may be used to couple the device to any type of components, peripherals, and/or accessory devices, such as a computer input device that may be integrated with the example device 600. The I/O interfaces 606 may also include data input ports via which any type of data, information, media content, communications, messages, and/or inputs may be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), readonly-memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 may be maintained as software instructions with a memory device 612 and executed by the processor system 608 as a software application. The device applications 614 may also include a device manager, such as any form of a control application, software application, signal processing and control module, code that is specific to a particular device, a hardware abstraction layer for a particular device, and so on.

In this example, the device 600 includes a remote assistance controller 618 that implements various aspects of the described features and techniques described herein. The remote assistance controller 618 is implemented with hardware components and/or in software as one of the device applications 614, such as when the example device 600 is implemented as the manager device 102 and/or the managed device 104 described with reference to FIGS. 1-5. An example of the remote assistance controller 618 is the remote assistance controller 114 implemented by the manager device 102 and/or the managed device 104, such as a software application and/or as hardware components in the manager device 102 and/or in the managed device 104. In implementations, the remote assistance controller 618 includes independent processing, memory, and logic components as a computing and/or electronic device integrated with the example device 600.

The example device 600 can also include a microphone 620 (e.g., to capture an audio recording of a user) and/or camera devices 622 (e.g., to capture video images of the user during a call), as well as motion sensors 624, such as may be implemented as components of an inertial measurement unit (IMU). The motion sensors 624 may be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating a location, position, acceleration, rotational speed, and/or orientation of the device. The example device 600 can also include one or more power sources 626, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations for remote assistance via video conferencing have been described in language specific to features and/or methods, the appended claims are not necessarily limited to the specific features or methods described. Rather, the specific features and methods are disclosed as example implementations for remote assistance via video conferencing, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

In some aspects, the techniques described herein relate to a method, including: sending, by a manager device with an established video conferencing connection, a device control request requesting control of a managed device, displaying a screen view of the managed device on a display of the manager device based on receiving a device control response approving the device control request, detecting a touch input at the display of the manager device, sending, to the managed device, position information of the touch input on the display of the manager device, and receiving feedback confirming that the position information of the touch input is implemented as a touch event at the managed device.

In some aspects, the techniques described herein relate to a method, wherein the position information includes at least one of a horizontal coordinate of the touch input or a vertical coordinate of the touch input.

In some aspects, the techniques described herein relate to a method, wherein detecting the touch input at the manager device is based on: receiving a live feed of the screen view of the managed device, and displaying the live feed of the screen view of the managed device on the display of the manager device.

In some aspects, the techniques described herein relate to a method, wherein the position information is based on the manager device mapping a source coordinate of the touch input at the manager device to a destination coordinate of a display of the managed device.

In some aspects, the techniques described herein relate to a method, further including receiving an indication of a screen size of the managed device with the device control response approving the device control request.

In some aspects, the techniques described herein relate to a method, wherein displaying the screen view of the managed device is based on adapting the screen size of the managed device to the display of the manager device.

In some aspects, the techniques described herein relate to a method, wherein the feedback includes a visual modification of a graphical user interface of the managed device being shown on the display of the manager device.

In some aspects, the techniques described herein relate to a method, wherein the feedback includes a message generated for display at the managed device and shown on the display of the manager device.

In some aspects, the techniques described herein relate to a method including: receiving, by a managed device with an established video conferencing connection, a device control request from a manager device requesting control of the managed device, sending a screen view of the managed device to the manager device based on a device control response approving the device control request, receiving position information of a touch input on a display of the manager device, converting the position information into a touch event at the managed device, and sending feedback confirming that the position information of the touch input on the display of the manager device is implemented as the touch event at the managed device.

In some aspects, the techniques described herein relate to a method, wherein the position information includes at least one of a horizontal coordinate or a vertical coordinate of the touch input on the display of the manager device.

In some aspects, the techniques described herein relate to a method, wherein sending the screen view includes streaming a continuous live feed of the screen view of the managed device to the manager device.

In some aspects, the techniques described herein relate to a method, wherein the position information is based on the managed device mapping a source coordinate of the touch input at the manager device to a destination coordinate of a display of the managed device.

In some aspects, the techniques described herein relate to a method, further including sending an indication of a screen size of the managed device with the device control response approving the device control request.

In some aspects, the techniques described herein relate to a method, wherein the feedback includes a visual modification of a graphical user interface of the managed device.

In some aspects, the techniques described herein relate to a method, wherein the feedback includes a message indicating the touch input is implemented as the touch event at the managed device.

In some aspects, the techniques described herein relate to a manager device, including: an interface for an established video conferencing connection, and a processor coupled with a memory, the processor configured to cause the manager device to: send a device control request that requests control of a managed device, display a screen view of the managed device on a display of the manager device based on a device control response that approves the device control request, detect a touch input at the display of the manager device, send, to the managed device, position information of the touch input on the display of the manager device, and receive feedback that confirms the position information of the touch input is implemented as a touch event at the managed device.

In some aspects, the techniques described herein relate to a manager device, wherein the position information includes at least one of a horizontal coordinate of the touch input or a vertical coordinate of the touch input.

In some aspects, the techniques described herein relate to a manager device, wherein the detection of the touch input at the manager device is based on the processor configured to cause the manager device to: receive a live feed of the screen view of the managed device, and display the live feed of the screen view of the managed device on the display of the manager device.

In some aspects, the techniques described herein relate to a manager device, wherein the position information is based on the processor configured to cause the manager device to map a source coordinate of the touch input at the manager device to a destination coordinate of a display of the managed device.

In some aspects, the techniques described herein relate to a manager device, wherein the processor is configured to cause the manager device to receive an indication of a screen size of the managed device with the device control response approving the device control request.

The invention claimed is:

1. A method, comprising:
    establishing, by a manager device, a video conferencing connection with a managed device;
    sending, by the manager device, a device control request requesting control of the managed device;
    receiving a device control response approving the device control request, wherein the device control response includes first size information associated with a display of the managed device;
    displaying a, via the video conferencing connection and based on the device control response, the display of the managed device on a display of the manager device;
    detecting a touch input at the display of the manager device;
    receiving second size information associated with the display of the managed device based on a change to the display of the managed device;
    sending, to the managed device and based on the second size information, position information of the touch input on the display of the manager device; and
    receiving feedback confirming that the position information of the touch input is implemented as a touch event at the managed device.

2. The method of claim 1, wherein the position information includes at least one of a horizontal coordinate of the touch input or a vertical coordinate of the touch input.

3. The method of claim 1, wherein detecting the touch input at the manager device is based on:
    receiving a live feed of the display of the managed device; and
    displaying the live feed of the display of the managed device on the display of the manager device.

4. The method of claim 1, further comprising receiving an indication of a screen size of the managed device with the device control response approving the device control request.

5. The method of claim 4, wherein displaying the display of the managed device is based on adapting the screen size of the managed device to the display of the manager device.

6. The method of claim 1, wherein the feedback includes a visual modification of a graphical user interface of the managed device being shown on the display of the manager device.

7. The method of claim 1, wherein the feedback includes a message generated for display at the managed device and shown on the display of the manager device.

8. The method of claim 1, wherein the position information includes an integer value, and wherein a first portion of bits in the integer value indicate a horizontal coordinate of the touch input and a second portion of bits in the integer value indicate a vertical coordinate of the touch input.

9. A method comprising:
    establishing, by a managed device, a video conferencing connection with a manager device;
    receiving, by the managed device, a device control request from the manager device requesting control of the managed device;
    sending a device control response approving the device control request, wherein the device control response includes first size information associated with a display of the managed device;
    sending a, via the video conferencing connection and based on the device control response, the display of the managed device to the manager device;
    sending second size information associated with the display of the managed device based on a change to the display of the managed device;
    receiving, based on the second size information, position information of a touch input on the display of the manager device;
    converting the position information into a touch event at the managed device; and
    sending feedback confirming that the position information of the touch input on the display of the manager device is implemented as the touch event at the managed device.

10. The method of claim 9, wherein the position information includes at least one of a horizontal coordinate of the touch input or a vertical coordinate of the touch input.

11. The method of claim 9, wherein sending the display includes streaming a continuous live feed of the display of the managed device to the manager device.

12. The method of claim 9, further comprising sending an indication of a screen size of the managed device with the device control response approving the device control request.

13. The method of claim 9, wherein the feedback includes a visual modification of a graphical user interface of the managed device.

14. The method of claim 9, wherein the feedback includes a message indicating the touch input is implemented as the touch event at the managed device.

15. The method of claim 9, wherein the position information includes an integer value, and wherein a first portion of bits in the integer value indicate a horizontal coordinate of the touch input and a second portion of bits in the integer value indicate a vertical coordinate of the touch input.

16. A manager device, comprising:
an interface for establishing a video conferencing connection; and
a processor coupled with a memory, the processor configured to cause the manager device to:
send a device control request that requests control of a managed device;
receive a device control response approving the device control request, wherein the device control response includes first size information associated with a display of the managed device;
display, via the video conferencing connection and based on the device control response, the display of the managed device on a display of the manager device;
detect a touch input at the display of the manager device;
receive second size information associated with the display of the managed device based on a change to the display of the managed device;
send, to the managed device and based on the second size information, position information of the touch input on the display of the manager device; and
receive feedback that confirms the position information of the touch input is implemented as a touch event at the managed device.

17. The manager device of claim 16, wherein the position information includes at least one of a horizontal coordinate of the touch input or a vertical coordinate of the touch input.

18. The manager device of claim 16, wherein to detect the touch input at the manager device, the processor is configured to cause the manager device to:
receive a live feed of the display of the managed device; and
display the live feed of the display of the managed device on the display of the manager device.

19. The manager device of claim 16, wherein the processor is configured to cause the manager device to receive an indication of a screen size of the managed device with the device control response approving the device control request.

20. The manager device of claim 16, wherein the position information includes an integer value, and wherein a first portion of bits in the integer value indicate a horizontal coordinate of the touch input and a second portion of bits in the integer value indicate a vertical coordinate of the touch input.

* * * * *